United States Patent
Sato et al.

(10) Patent No.: US 10,283,774 B2
(45) Date of Patent: May 7, 2019

(54) BIPOLAR ELECTRODE, BIPOLAR SECONDARY BATTERY USING THE SAME AND METHOD FOR MANUFACTURING BIPOLAR ELECTRODE

(75) Inventors: Masanobu Sato, Tokyo (JP); Yasuo Ohta, Yokohama (JP); Hideaki Horie, Yokosuka (JP); Masanori Aoyagi, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 308 days.

(21) Appl. No.: 13/811,793

(22) PCT Filed: Jul. 21, 2011

(86) PCT No.: PCT/JP2011/066580
§ 371 (c)(1),
(2), (4) Date: Jan. 23, 2013

(87) PCT Pub. No.: WO2012/014780
PCT Pub. Date: Feb. 2, 2012

(65) Prior Publication Data
US 2013/0122362 A1 May 16, 2013

(30) Foreign Application Priority Data
Jul. 28, 2010 (JP) .................................. 2010-168984

(51) Int. Cl.
*H01M 4/583* (2010.01)
*H01M 4/04* (2006.01)
(Continued)

(52) U.S. Cl.
CPC ......... *H01M 4/583* (2013.01); *H01M 4/0404* (2013.01); *H01M 4/0435* (2013.01);
(Continued)

(58) Field of Classification Search
USPC ............................................. 429/210; 427/58
See application file for complete search history.

(56) References Cited

U.S. PATENT DOCUMENTS

| 6,077,623 A | 6/2000 | Grosvenor et al. |
| 7,749,653 B2 | 7/2010 | Wakita et al. |

(Continued)

FOREIGN PATENT DOCUMENTS

| CN | 101075690 A | 11/2007 |
| JP | 9-232003 A | 9/1997 |

(Continued)

OTHER PUBLICATIONS

Taiwan Office Action, dated Oct. 14, 2013, 5 pages.
Russian Decision on Grant, Apr. 17, 2014, 14 pages.

*Primary Examiner* — Osei K Amponsah
(74) *Attorney, Agent, or Firm* — Foley & Lardner LLP

(57) ABSTRACT

A bipolar electrode is composed of a first active material layer which is, for example, a positive electrode active material layer formed to include a first active material on one side of a collector, and a second active material layer which is, for example, a negative electrode active material layer formed to include a second active material with less compressive strength than that of the first active material on the other side of the collector. Then, a density adjusting additive which is an additive material with larger compressive strength than that of the second active material is included in the second active material layer.

13 Claims, 6 Drawing Sheets

(51) Int. Cl.
*H01M 4/13* (2010.01)
*H01M 4/139* (2010.01)
*H01M 4/62* (2006.01)
*H01M 10/04* (2006.01)
*H01M 4/36* (2006.01)
H01M 10/0525 (2010.01)
H01M 10/0585 (2010.01)
H01M 4/131 (2010.01)
H01M 4/133 (2010.01)
H01M 4/134 (2010.01)
H01M 4/02 (2006.01)

(52) U.S. Cl.
CPC ............ *H01M 4/13* (2013.01); *H01M 4/139* (2013.01); *H01M 4/364* (2013.01); *H01M 4/62* (2013.01); *H01M 10/0418* (2013.01); H01M 4/0409 (2013.01); H01M 4/131 (2013.01); H01M 4/133 (2013.01); H01M 4/134 (2013.01); H01M 10/0525 (2013.01); H01M 10/0585 (2013.01); H01M 2004/021 (2013.01)

(56) References Cited

U.S. PATENT DOCUMENTS 7,829,136 B2  11/2010  Saito et al.

| | | | | |
|---|---|---|---|---|
| 2004/0091771 A1* | 5/2004 | Hosaka | ............... | H01M 2/08 429/185 |
| 2004/0157101 A1 | 8/2004 | Smedley | | |
| 2005/0132562 A1* | 6/2005 | Saito | ............... | H01M 4/0404 29/623.5 |
| 2006/0216600 A1* | 9/2006 | Inagaki | ............... | H01M 2/06 429/231.1 |
| 2007/0264575 A1* | 11/2007 | Wakita | ............... | H01M 4/133 429/232 |
| 2008/0014498 A1* | 1/2008 | Ogawa | ............... | H01M 4/131 429/149 |
| 2008/0124631 A1* | 5/2008 | Fukui | ............... | H01M 4/0404 429/217 |
| 2008/0220330 A1* | 9/2008 | Hosaka et al. | ............... | 429/209 |
| 2010/0140554 A1 | 6/2010 | Oki et al. | | |
| 2011/0294007 A1* | 12/2011 | Hosaka et al. | ............... | 429/210 |

FOREIGN PATENT DOCUMENTS

| | | | |
|---|---|---|---|
| JP | 2006-128039 A | 5/2006 | |
| JP | 2007-026725 A | 2/2007 | |
| JP | 2007-179956 A | 7/2007 | |
| JP | 2007-305545 | * 11/2007 | ............ H01M 4/02 4/58 |
| JP | 2008-166047 A | 7/2008 | |
| JP | 2008-262791 A | 10/2008 | |
| JP | 2009-054552 A | 3/2009 | |
| WO | WO 2006/048726 A1 | 5/2006 | |

* cited by examiner

ELONGATION DEGREE: ABOUT 1%

ELONGATION DEGREE: ABOUT 1%

POWDER PRESSURE – PLANE-DIRECTION ELONGATION CURVE

ELONGATION DEGREE: ABOUT 3%

ELONGATION DEGREE: 1%

BIPOLAR ELECTRODE, BIPOLAR SECONDARY BATTERY USING THE SAME AND METHOD FOR MANUFACTURING BIPOLAR ELECTRODE

TECHNICAL FIELD

The present invention relates to a bipolar electrode, a bipolar secondary battery using the same and a method for manufacturing the bipolar electrode.

BACKGROUND ART

In recent years, due to an increase in the demand for electrically driven vehicles such as hybrid electric vehicle (HEV) and electric vehicle (EV), the production volume of secondary batteries serving as a driving source of these electrically driven vehicles has been increasing. As for the structure of secondary batteries, there is a well-known bipolar secondary battery which is structured to arrange collector plates in the positive electrode and the negative electrode of a battery element having serially laminated single cells, as disclosed in, for example, JP1997-232003A.

In the bipolar secondary battery according to JP1997-232003A, a collector having a positive electrode material layer arranged only on one side thereof, a collector having at least a positive electrode material layer arranged on one side thereof and a negative electrode material layer arranged on the other side thereof, and a collector having a negative electrode material layer arranged only on one side are laminated via lithium ion conductive electrolyte layers so that the positive electrode material layers oppose the negative electrode material layers entirely. Then, the bipolar secondary battery is provided with a battery element having means for shielding at least the positive electrode material layers, the negative electrode material layers and the electrolyte layers in the laminated body from the external air.

SUMMARY

In the bipolar electrode as shown in JP1997-232003A in which a positive electrode active material layer is laminated on one side of a collector and a negative electrode active material layer is laminated on the other side thereof, different active material layers are arranged at the front and back of a collector. Therefore, in a process of fabricating the bipolar electrode, different stresses occur in both active material layers arranged at the front and back of a collector when both active material layers are pressed simultaneously, whereby posing threat that a bipolar electrode may warp.

Therefore, the present invention was achieved in view of the above problems and aims at providing a bipolar electrode, a bipolar secondary battery using the same and a method for manufacturing the bipolar electrode, that are preferable for suppressing a warp of a bipolar.

In order to achieve the above aim, the present invention provides a bipolar electrode composed of a first active material layer formed to include a first active material on one side of a collector, and a second active material layer formed to include a second active material whose compressive strength is less than that of the first active material layer on the other side of the collector. Then, an additive material whose compressive strength is larger than that of the second active material layer is included in the second active material layer.

Details as well as other features and advantages of the present invention will be explained in the following description in the specification and illustrated in accompanying drawings.

DESCRIPTION OF EMBODIMENTS

A bipolar electrode, a bipolar secondary battery using the same and a method for manufacturing the bipolar electrode according to the present invention will be explained below based on one embodiment. Note that same reference numbers refer to corresponding elements throughout the drawings. It should also be noted that the drawings include an exaggerated dimensional ratio which may differs from an actual ratio for convenience of explanation. Each embodiment will be explained below by exemplifying a bipolar lithium ion secondary battery.

<Overall Structure of Battery>

Figure 1:
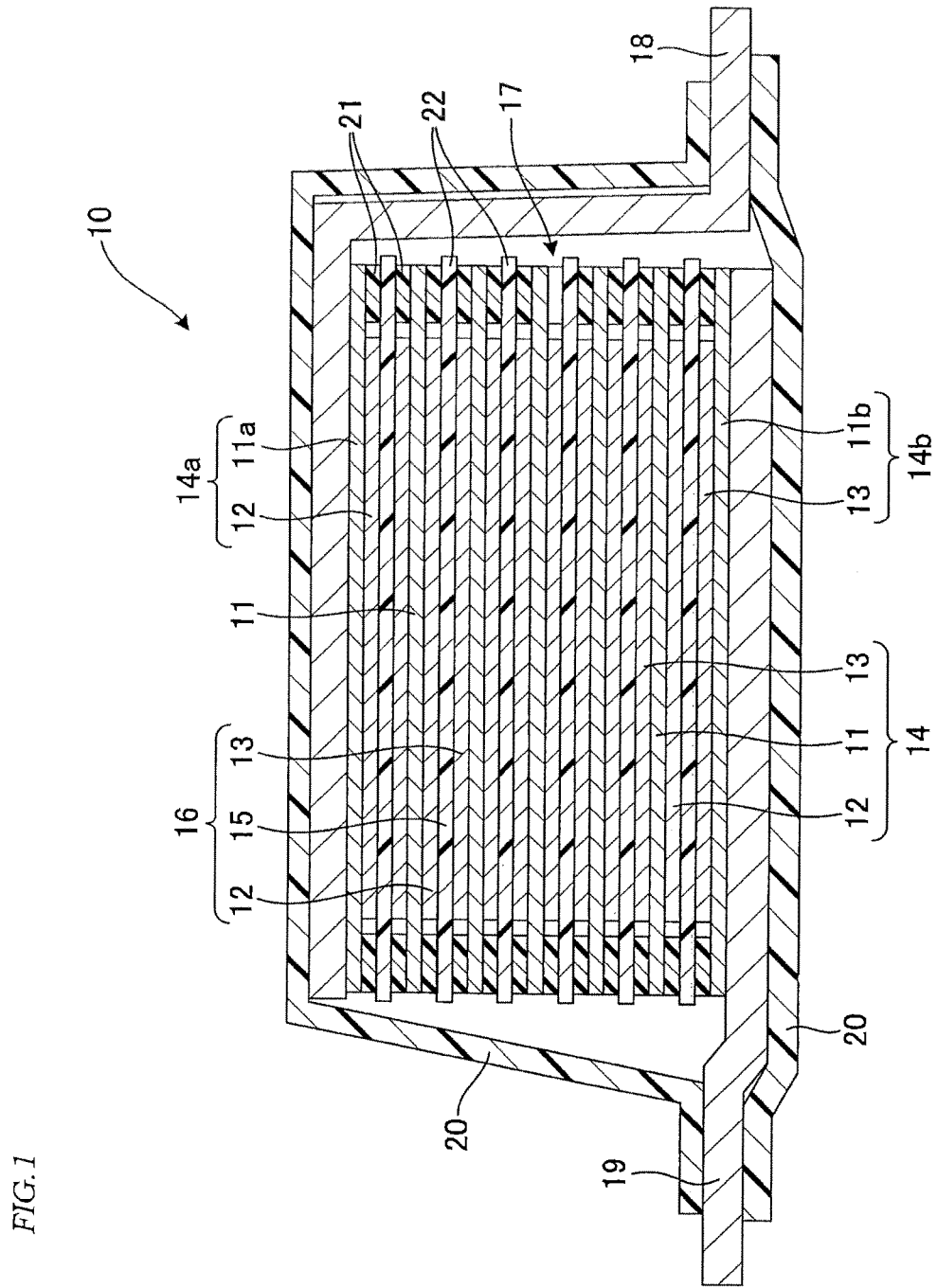
FIG. 1 is a schematic cross sectional view schematically illustrating an overall structure of a bipolar secondary battery exhibiting one embodiment of the present invention.

FIG. 1 is a schematic cross sectional view typically showing an overall structure of a flat (or laminated) lithium ion secondary battery (which is simply referred to as a bipolar lithium ion secondary battery or a bipolar secondary battery hereinafter) being representative one embodiment of a lithium ion secondary battery using a bipolar electrode according to the present invention.

As shown in FIG. 1, a bipolar lithium ion secondary battery 10 according to the present embodiment is structured such that a substantially rectangular battery element 17 in which charge/discharge reaction actually progresses is sealed in the inside of a battery sheath material 20. As shown in FIG. 1, the battery element 17 in the bipolar secondary battery 10 of the present embodiment is provided by holding an electrolyte layer 15 between bipolar electrodes 14 each of which is composed of two or more layers so that a positive electrode active material layer 12 and a negative electrode active material layer 13 in the adjacent bipolar electrodes 14 oppose to each other via the electrolyte layer 15. Here, the bipolar electrode 14 has a structure such that the positive electrode active material layer 12 is arranged on one side of a collector 11 and the negative electrode active material layer 13 is arranged on the other side thereof. That is, the bipolar secondary battery 10 comprises the battery element 17 structured by laminating, via the electrolyte layers 15, a plurality of the bipolar electrodes 14 each of which has the positive electrode active material layer 12 on one side of the collector 11 and the negative electrode active material layer 13 on the other side thereof.

The positive electrode active material layer 12, the electrolyte layer 15 and the negative electrode active material layer 13 that are adjacent to each other constitute one single cell layer 16. Accordingly, the bipolar secondary battery 10 can also be said to have a structure of laminating the single cell layers 16. A seal part 21 is arranged in the periphery of the single cell layer 16 in order to prevent liquid junction caused by leakage of an electrolytic solution from the electrolyte layer 15. Arrangement of the seal pact 21 also enables insulation between the adjacent collectors 11 and prevention of a short circuit resulting from contact between adjacent electrodes or contact between the positive electrode active material layer 12 and the negative electrode active material layer 13.

Note that a cathode electrode 14a and an anode electrode 14b that are positioned in the outermost layers of the battery element 17 may not need to have the bipolar electrode structure. For example, the positive electrode active material layer 12 may be formed on only one side of an outermost-layer cathode collector 11a positioned in the outermost layer of the battery element 17. Similarly, the negative electrode active material layer 13 may be formed on only one side of an outermost-layer anode collector 11b positioned in the outermost layer of the battery element 17. Also, in the bipolar lithium ion secondary battery 10, a positive electrode collector plate 18 which also functions as a positive electrode tab and a negative electrode collector plate 19 which also functions as a negative electrode tab are joined to the outermost-layer cathode collector 11a and the outermost-layer anode collector 11b disposed in upper and lower ends, respectively. However, the outermost-layer cathode collector 11a may be extended to serve as the positive electrode collector plate 18 and derived from a laminate sheet which is the battery sheath material 20. Similarly, the outermost-layer cathode collector 11b may also be extended to serve as the negative electrode collector 19 and similarly derived from a laminate sheet which is the battery sheath material 20.

The bipolar lithium ion secondary battery 10 should also be structured to decompress and encapsulate the battery element 17 in the battery sheath material 20 and pull out the positive electrode collector plate 18 and the negative electrode collector plate 19 to the outside of the battery sheath material 20. This is because such a structure makes it possible to prevent impact received from the outside and environmental degradation when the battery is used. A basic structure of the bipolar lithium ion secondary battery 10 can also be said to have serial connection of a plurality of the laminated single cell layers 16. The bipolar electrode 14 according to the present invention for use in the bipolar secondary battery 10 is composed of at least two layers in which the collector 11 includes a polymer material.

Next, the bipolar lithium ion secondary battery 10 and each member of the bipolar electrode 14 used therefor will be explained.

Well-known materials can be used for the collector 11 without particular limitation. For examples, materials preferably used for the collector 11 include aluminum and stainless (SUS). Polymer materials can also be included in the collector 11. For example, polyolefine (such as polypropylene and polyethylene), polyester (such as PET and PEN), polyimide, polyamide and polyvinylidene fluoride (PVDF) can be used. In this case, particles made of carbon (such as Ketjen black, acetylene black and carbon black) and metal (such as Al, Cu, SUS and Ti) are preferably dispersed to give a dielectric property to a polymer material.

The positive electrode active material layer 12 includes a positive electrode active material and functions as the positive electrode of a single cell layers 16. The positive electrode active material layer 12 can include, in addition to a positive electrode active material, a conductive auxiliary and a binder. As a positive electrode active material, for example, a complex oxide made of transition metal and lithium, which is also usable in solution-based lithium ion batteries, can be used. Concretely, a lithium-transition metal complex oxide is preferable and examples include a Li—Mn-based complex oxide such as lithium manganate ($LiMn_2O_4$) and a Li—Ni-based complex oxide such as lithium nickelate ($LiNiO_2$). In some cases, two or more kinds of positive electrode active materials may be used in combination.

The negative electrode active material layer 13 includes a negative electrode active material and functions as the negative electrode of the single cell layers 16. The negative electrode active material layer 13 can include, in addition to a negative electrode active material, a conductive auxiliary and a hinder. As a negative electrode active material, a negative electrode active material which is also usable in solution-based lithium ion batteries can be used.

Specifically, carbon materials are preferable. Carbon materials include, for example, graphite-based carbon materials such as natural graphite, artificial graphite and expanded graphite (simply referred to as graphite hereinafter), carbon black, activated carbon, carbon fiber, coke, soft carbon and hard carbon. More preferably, graphite such as natural graphite, artificial graphite and expanded graphite should be used. Examples of usable natural graphite include flake graphite and lump graphite. Usable artificial graphite includes lump graphite, vapor growing graphite, flake graphite and fibrous graphite. Among them, particularly preferable materials are flake graphite and lump graphite. Use of flake graphite and lump graphite is particularly advantageous because of realizing high filling density or the like. In some cases, two or more kinds of negative electrode active materials may be used in combination.

In particular, by using a lithium-transition metal complex oxide as a positive electrode active material for the positive electrode active material layer 12 and a carbon or lithium-transition metal complex oxide as a negative electrode active material for the negative electrode active material layer 13, a battery which is excellent in the capacity and output characteristics can be constructed.

Note that a negative electrode active material is not limited to a carbon or lithium-transition metal complex oxide and any materials capable of occluding and emitting lithium can be used without particular limitation. For example, it is possible to use a material provided in a form of including an element which can be alloyed with lithium. Examples of an element which can be alloyed with lithium include silicon, germanium, tin, lead, aluminum, indium and zinc. By using an active material including such elements as a simple substance, oxide or carbohydrate for the negative electrode active material, the battery capacity can be increased. Note that only one kind of such elements may be included in the negative electrode active material or two or more kinds thereof may also be included in the negative electrode active material. Among these elements, silicon or tin is preferably included in the negative electrode active material and including silicon is most preferable.

Concrete examples of a negative electrode active material including an element which can be alloyed with lithium include, for instance, a metal compound, metal oxide, lithium metal compound and lithium metal oxide (including lithium-transition metal complex oxide). As a negative electrode active material in the form of a metal compound, LiAl, $Li_4Si$, $Li_{4.4}Pb$ and $Li_{4.4}Sn$ or the like are suggested. Also suggested as a negative electrode active material in the form of a metal oxide are SnO, $SnO_2$, GeO, $GeO_2$, $In_2O$, $In_2O_3$, PbO, $PbO_2$, $Pb_2O_3$, $Pb_3O_4$, SiO and ZnO or the like. Note that only one kind of these negative electrode active materials may be included in the negative electrode active material layer 15 or two or more kinds thereof may also be included in the negative electrode active material layer 15. Among these materials, $Li_4Si$, $Li_{4.4}Sn$, SnO, $SnO_2$ and SiO are preferably used as a negative electrode active material and using SiO is particularly preferable.

The electrolyte layer 15 is a layer including an ion conductive polymer or a liquid electrolyte. The electrolyte used in the present embodiment is a polymer gel electrolyte which is obtained by impregnating a separator 22 serving as a base material with a pregel solution, which is followed by chemical cross-linking or physical cross-linking for use as a polymer gel electrolyte. Note that the separator 22 has a melting point of about 12 C.° and an electrolyte solvent has a boiling point of about 14 C.° in the present embodiment.

<Seal Part>

The seal part 21 is provided to seal the battery element 17. The seal part 21 is arranged in the outer periphery of a single cell layers 16 and reduction of ion conductivity in an electrolyte is prevented by sealing the battery element 17. Also, when a liquid or semisolid gel electrolyte is used, liquid junction caused by liquid leakage is prevented.

As a precursor of the seal, for example, a heat fusible resin such as a rubber-based resin which is brought into close contact with the collector 11 by being pressed and deformed or an olefin-based resin which is brought into close contact with the collector 11 by heat fusion through heating and pressing can be preferably used.

There is no particular limitation on the rubber-based resin. A preferably used rubber-based resin is selected from the group consisting of silicon-based rubber, fluorine rubber, olefin-based rubber and nitrile-based resin. These rubber-based resins are excellent in sealing, alkali resistance, chemical resistance, durability, weather resistance and heat resistance and these excellent performances and qualities can be maintained for a long term without deterioration even in usage environment.

As a heat fusible resin, any resins capable of demonstrating excellent seal effects in any usage environments of the battery element 17 can be used without particular limitation. A resin selected from the group consisting of silicon, epoxy, urethane, polybutadiene, olefin-based resin (such as polypropylene and polyethylene) and paraffin wax is preferably used. These heat fusible resins are excellent in sealing, alkali resistance, chemical resistance, durability, weather resistance and heat resistance and these excellent performances and qualities can be maintained for a long term without deterioration even in usage environment.

<Collector (Tab)>

The positive and negative electrode collector plates 18 and 19 are provided to pull out power generated in the battery element 17 to the outside of the bipolar secondary battery 10. Also, materials used for the positive and negative electrode collector plates 18 and 19 are not particularly limited and well-known materials can be used therefor. For example, aluminum, stainless (SUS) and polymer materials are preferably used.

<Sheath Material>

The sheath material 20 is provided to shield a battery inner part of the bipolar secondary battery 10 and protect a battery inner part. The sheath material 20 which is not damaged by a pressure difference between a battery inner part and a battery outer part is formed by a flexible sheet material which can be easily deformed. The sheet material is desirably provided with electric insulation without allowing transmission of an electrolyte solution and gas and chemically stable against materials such as an electrolyte solution.

As a sheet material, a laminate film, polyethylene, polypropylene and polycarbonate are preferably used. A laminate film is prepared by coating metal such as aluminum, stainless, nickel and copper or metal foil made of an alloy including the above metal with an insulating synthetic resin film such as a polypropylene film.

The battery element 17 in the bipolar secondary battery 10 is fabricated as follows. Firstly, the bipolar electrode 14, in which the positive electrode active material layer 12 is formed on one side of the collector 11 and the negative electrode active material layer 13 is formed on the other side thereof, and the electrolyte layer 15 including the separator 22 are laminated alternately with arrangement of the seal part 21, which is uncured, in the outer periphery in order to form a laminate. Then, the cathode electrode 14a and the anode electrode 14b, each of which is prepared by forming only the positive electrode active material layer 12 or the negative electrode active material layer 13 on one side or the other side of the collector 11, are arranged in both end surfaces of the laminated body in the lamination direction. Thereafter, the laminated body is heat-pressed by a heat press machine to compress the seal part 21 to a predetermined thickness and cure the seal part 21, whereby the bipolar battery element 17 is completed.

By the way, in manufacturing the bipolar electrode 14, paste including a positive electrode active material or other materials is applied and dried on one side of the collector 11 while paste including a negative electrode active material or other materials is applied and dried on the other side of the collector 11 according to an ordinary method. Next, in order to improve smoothness on the surface and evenness in the thickness as well as realize a desired film thickness, the electrode structure is pressed from both sides for density adjustment of the electrodes.

However, when the electrode is pressed for density adjustment, a phenomenon occurs such that a difference in the filling property between the positive electrode active material layer 12 and the negative electrode active material layer 13 causes larger elongation in the plane direction on the active material layer with a low filling property and one side is crushed too much to result in providing the active material layers with different thicknesses at the front and back of the collector 11. Then, different stresses generated by the active material layers at the front and back of the collector 11 causes the collector 11 or the bipolar electrode 14 to warp.

Such a phenomenon is more remarkable in the bipolar lithium ion secondary battery 10 for electric vehicle because the demand for higher capacity and higher energy density requires a thicker active material layer to be applied and a stress occurring by pressing becomes larger. That is, it is required to realize high filling of the positive electrode active material layer 12 and a press pressure to achieve high filling of the positive electrode active material layer 12 results in crushing the negative electrode active material layer 13 too much. Thus, a large warp of the bipolar electrode 14 poses threat of reducing capacity retention of the battery element 17 and reducing durability to vibrations. There is also a risk that handling the bipolar secondary battery 10 in a lamination process may change for the worse or reliability of the seal part 21 may be deteriorated.

Therefore, in order to resolve such defects, an active material layer which is selected out of the positive and negative electrode active material layers and includes an active material with smaller compressive strength is structured to include a material with larger compressive strength than that of the active material in the bipolar electrode 14.

Figure 2A:
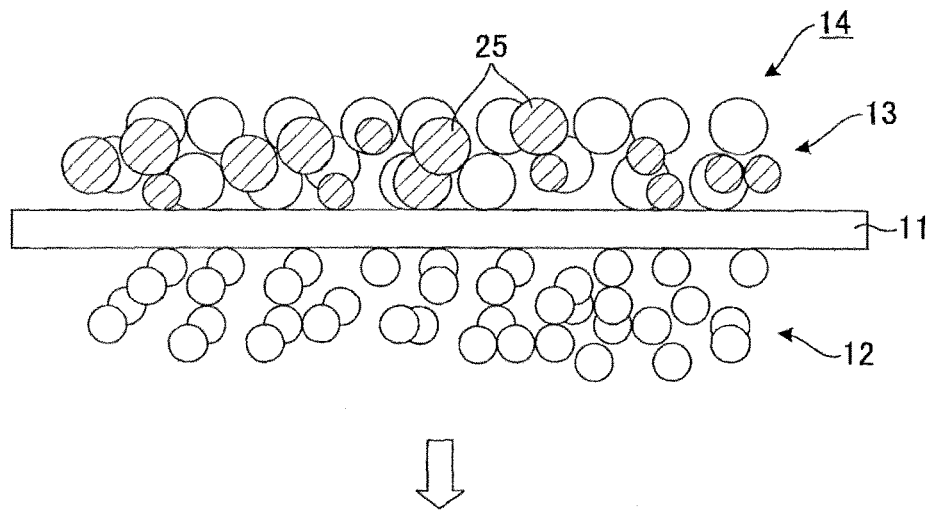
FIG. 2A is an explanatory diagram illustrating a state before pressing a bipolar electrode in which a density adjusting additive is mixed with a negative electrode active material.
Figure 2B:
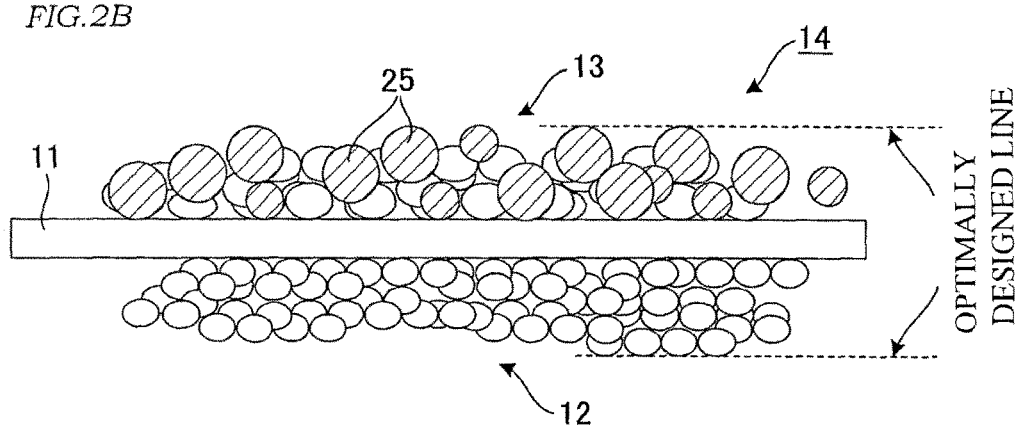
FIG. 2B is an explanatory diagram illustrating a state after pressing the bipolar electrode of FIG. 2A.

FIG. 2 illustrates a process of manufacturing the bipolar electrode 14 in the present embodiment, wherein FIG. 2A illustrates a state before pressing the positive electrode and negative electrode active material layers 12 and 13 and FIG. 2B illustrates a state after pressing.

The bipolar electrode 14 shown in FIG. 2A is in a state such that paste including a positive electrode active material or other materials is applied and dried on one side of the collector 11 and paste including a negative electrode active material or other materials is applied and dried on the other side of the collector 11. The paste including a negative electrode active material or other materials is prepared by including, in addition to a negative electrode active material and a binding agent, a density adjusting additive 25 made of hard particles that are difficult to crush and the paste is dispersed in N-methylpyrrolidone (NMP) which is a slurry viscosity adjusting solvent so as to present a negative electrode slurry. Then, on the opposite side surface of the collector 11 on which the positive electrode active material layer 12 was formed, the paste including a negative electrode active material or other materials is applied and dried.

Then, a density adjustment is made for the bipolar electrode 14 shown in FIG. 2A, in which the positive/negative electrode active material layers 12 and 13 have been dried, by pressing the positive/negative electrode active material layers 12 and 13 from both sides (see FIG. 2B). In the density adjustment by pressing, it is desirable to crush the layers as much as possible in order to increase energy density. However, if the positive/negative electrode active material layers 12 and 13 or the negative electrode active material layer 13 in particular, are crushed too much, gaps between active materials are filled up and an overvoltage is made larger to cause electric repulsion of lithium and reduce a service life. For example, if graphite is crushed to a degree beyond 1.6 g/cc, a service life will be reduced. That is, the degree of crushing by pressing for density adjustment and reduction of a service life of the battery are in a trade-off relation. Therefore, it is desirable to set an "optimally designed line" to suggest an optimally crushed degree for each active material in a range without causing reduction of a service life.

Press operation may be carried out by either a cold press roll method or a hot press roll method. In the case of the hot press roll method, if electrolyte supporting salt or polymerizable polymer is included in the active material layers, press operation is desirably carried out at a temperature equal to or less than a temperature to dissolve these materials. A roll press machine is not particularly limited and heretofore known roll press machines such as a calender roll can be used appropriately. However, other heretofore known press devices such as a flat plate press and press techniques may also be used appropriately. Conditions such as a press pressure and time vary depending on materials and a desired film thickness. In the present embodiment, when an optimum press pressure of the positive electrode active material layer 12 is, for example, a linear pressure of 60 to 350 t/m, this linear pressure is used to execute the aforementioned density adjustment by pressing.

The negative electrode active material layer 13 is made difficult to crush even when it is pressed for density adjustment because hard particles difficult to crush are included as the density adjusting additive 25 in paste. Hard particles that are difficult to crush and serve as the density adjusting additive 25 allow a thickness adjustment of the negative electrode active material layer 13 relative to a press pressure by adjusting an added amount, a particle diameter and filling compressibility of the particles. Therefore, even if the layers are pressed with a high press pressure to achieve high filling of the positive electrode active material layer, the negative electrode active material layer 13 is allowed to maintain an optimally designed thickness to exhibit the most satisfactory characteristics.

Therefore, a warp of the bipolar electrode 14 observed after pressing can be suppressed, while making it possible to suppress reduction of capacity retention in the battery element 17 and also suppress reduction of durability to vibrations. It is also possible to improve handling of the bipolar secondary battery 10 in a lamination process and improve reliability of the seal part 21.

As the density adjusting additive 25 made of hard particles that are difficult to crush, for example, alumina particles are suggested. It is also possible to use particles made of titanium dioxide ($TiO_2$) and magnesium oxide (MgO) or other materials. Then, for example, on the assumption that an optimally designed value set for the thickness of the negative electrode active material layer 130 is 100 μm, a negative electrode slurry obtained by dispersing 5 to 8 wt % particles with volume particle size distribution D90: 30 μm and D50: 20 μm in NMP which is a slurry viscosity adjusting solvent can be used.

Figure 3:
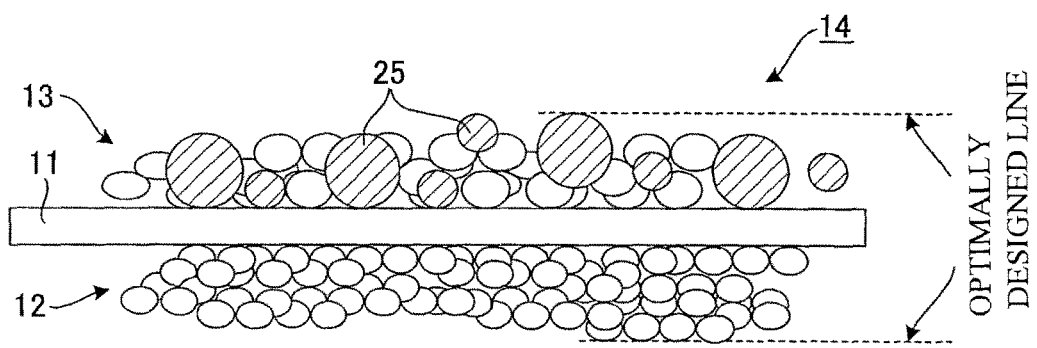
FIG. 3 is an explanatory diagram illustrating a state after pressing a bipolar electrode in which a density adjusting additive with a large particle diameter is mixed with a negative electrode active material.

Hard particles that are difficult to crush and serve as the density adjusting additive 25 can be as shown in FIG. 3, wherein a maximum particle diameter is substantially equal to an optimum thickness of the electrode active material layer which is easily crushed. By doing so, even if the amount of the additive is reduced, an effect can be exhibited such that the negative electrode active material layer 13 is allowed to maintain an optimally designed thickness to exhibit the most satisfactory characteristics. For example, on the assumption that an optimally designed value set for the thickness of the negative electrode active material layer 13 is 100 μm, it is possible to use, for example, alumina particles whose particle diameter corresponds to volume particle size distribution D90: 90 µm and D50: 60 µm as the density adjusting additive 25 made of hard particles that are difficult to crush. In addition, the negative electrode active material layer 13 is allowed to have a thickness of 100 µm with a small content of the additive in a slurry (5 wt %).

Figure 4:
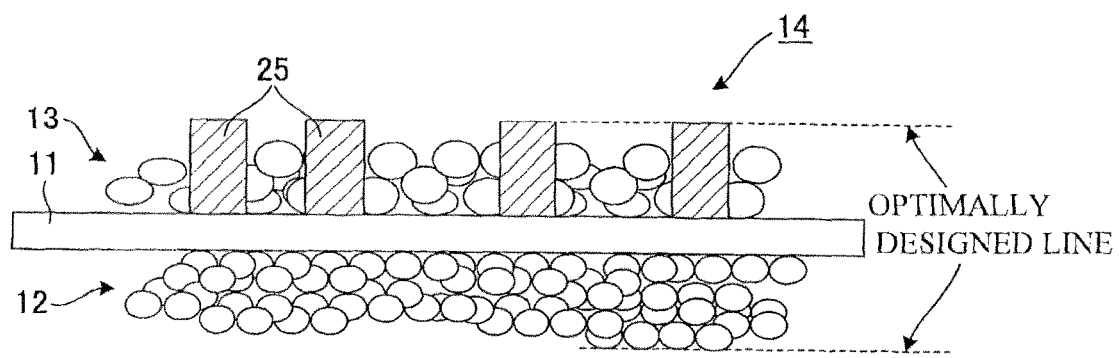
FIG. 4 is an explanatory diagram illustrating a state after pressing a bipolar electrode in which a density adjusting additive having an anisotropic shape is mixed with a negative electrode active material.

Particles that are difficult to crush and serve as the density adjusting additive 25 can also be formed as shown in FIG. 4, wherein the additive has an anisotropic cylindrical, conical or rectangular shape or similar shape and a long side thereof corresponds to an optimum thickness of the electrode active material layer which is easily crushed. The aforementioned anisotropic cylindrical, conical or rectangular shape or similar shape can be obtained by electrolytic deposition of copper Cu in a state of masking the layer by a masking tape with opened holes. Such anisotropic cylindrical, conical or rectangular hard particles that are difficult to crush include those standing with a short side by falling down, but a thickness adjustment can be made by a large number of those standing with a long side. In this case, even if the amount of the additive is further reduced, an effect can be exhibited such that the negative electrode active material layer 13 is allowed to maintain an optimally designed thickness to exhibit the most satisfactory characteristics.

Figure 5:
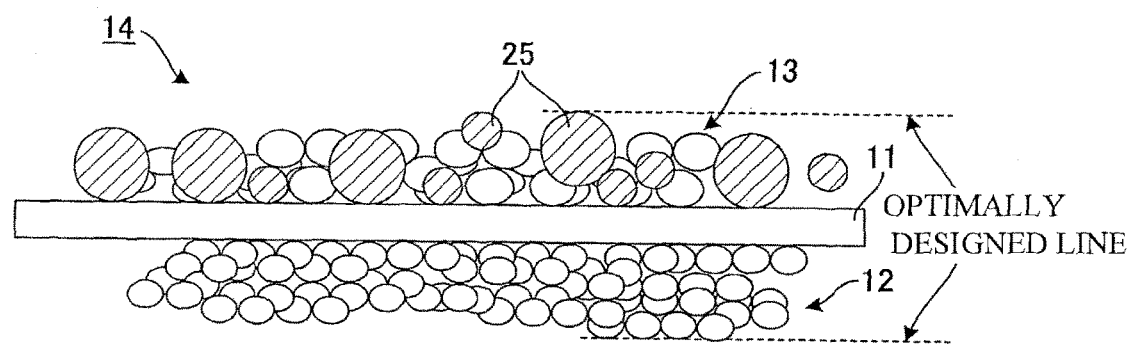
FIG. 5 is an explanatory diagram illustrating a state after pressing a bipolar electrode in which a density adjusting additive being usable as an active material is mixed with a negative electrode active material.

Furthermore, for particles that are difficult to crush and serve as the density adjusting additive 25, a material which allows the additive itself to be used as an active material can be used as shown in FIG. 5. In this case, since the additive itself is chargeable/dischargeable active material, a charge/discharge loss can be eliminated. For particles that are difficult to crush and serve as the density adjusting additive 25, for example, a solid hard carbon material is considered. It is also possible to use particles made of silica ($SnO_2$) such as silicone (Si) and silicon oxide (SiO). Then, for example, on the assumption that an optimally designed value set for the thickness of the negative electrode active material layer 13 is be 90 µm, a negative electrode slurry obtained by dispersing 5 wt/% particles whose particle diameter corresponds to, for example, volume particle size distribution D90: 80 µm and D50: 60 µm in NMP which is a slurry viscosity adjusting solvent.

In addition, as hard particles that are difficult to crush and serve as the density adjusting additive 25, an additive having the same mechanical characteristics in relation to a press pressure and elongation as an electrode active material layer which is difficult to crush or the positive electrode active material layer 12 can be added to an electrode active material layer which is easily crushed or the negative electrode active material layer 13.

Figure 9A:
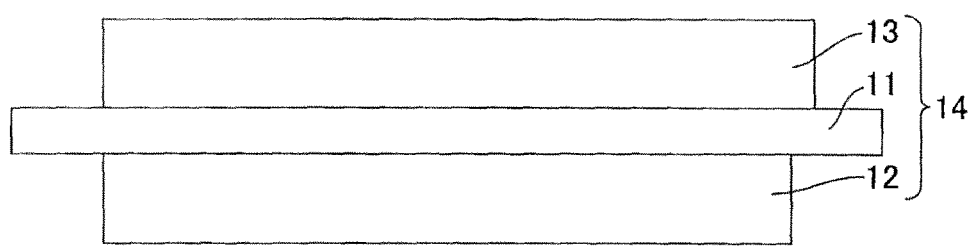
FIG. 9A is an explanatory diagram illustrating a state before pressing a bipolar electrode according to a known art.
Figure 9B:
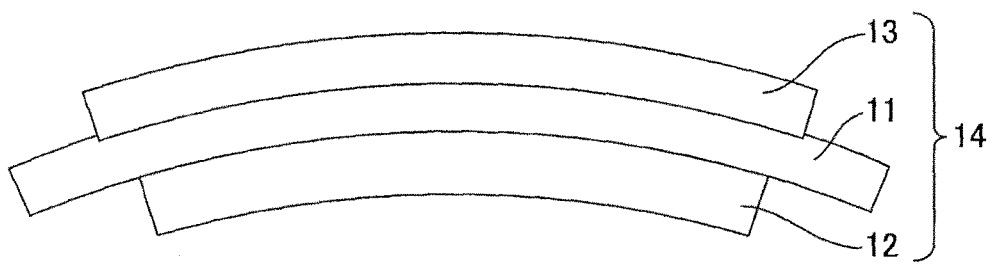
FIG. 9B is an explanatory diagram illustrating a state after pressing the bipolar electrode of FIG. 9A.

That is, the cause of a warp occurring in the bipolar electrode 14 is a difference in the degree of elongation between the positive electrode active material layer 12 and the negative electrode active material layer 13 when they are pressed as shown in FIG. 9A. Then the electrode active material layer with a larger degree of elongation gives an internal stress to the electrode active material layer which is less elongated in order to counteract a potential difference, whereby resulting in occurrence of a warp as shown in FIG. 9B.

Figure 6A:
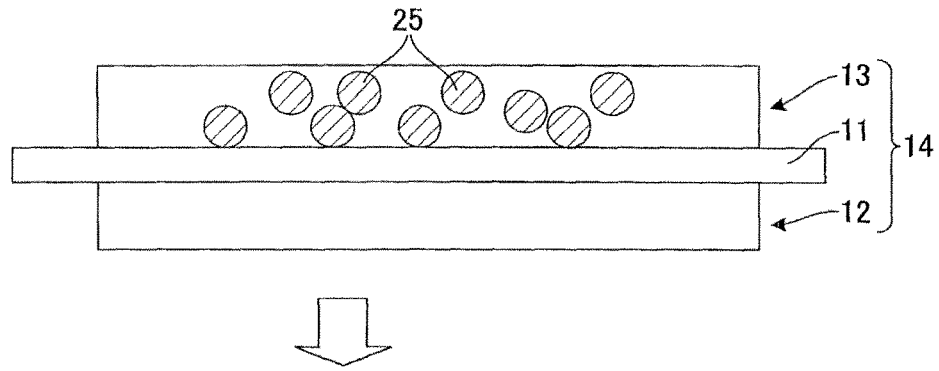
FIG. 6A is an explanatory diagram illustrating a state before pressing a bipolar electrode in which a density adjusting additive having the same mechanical characteristics as a positive electrode active material layer in relation to a press pressure and elongation is mixed with a negative electrode active material.
Figure 6B:
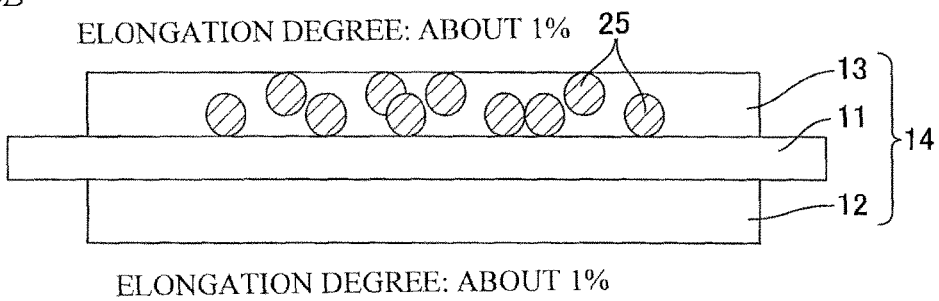
FIG. 6B is an explanatory diagram illustrating a state after pressing the bipolar electrode of FIG. 6A.

Accordingly, in order to resolve the issue, an additive having equivalent mechanical characteristics in relation to a press pressure and elongation to those of an active material in the electrode active material layer which is difficult to crush is added to the electrode active material layer which is easily crushed, as shown in FIG. 6A. Therefore, elongation of the additive controls the rate on the electrode active material layer which is less elongated and therefore a warp is suppressed as shown in FIG. 6B. Owing to the warp suppression, reduction of capacity retention in the battery element 17 can be suppressed while making it possible to suppress reduction of durability to vibrations. It is also possible to improve handleability in a process of assembling the bipolar secondary battery 10, in addition to enable improvement of reliability in the seal member to be laminated.

An additive to be used is, for example, $TiO_2$ additive. Particles made of MgO or other materials can also be used. Then, on the assumption that an optimally designed value se for the thickness of the negative electrode active material layer 13 is 100 µm, a negative electrode slurry obtained by dispersing 5 wt % particles whose particle diameter corresponds to, for example, volume particle size distribution D90: 80 µm and D50: 60 µm in NMP which is a slurry viscosity adjusting solvent can be used.

Figure 7:
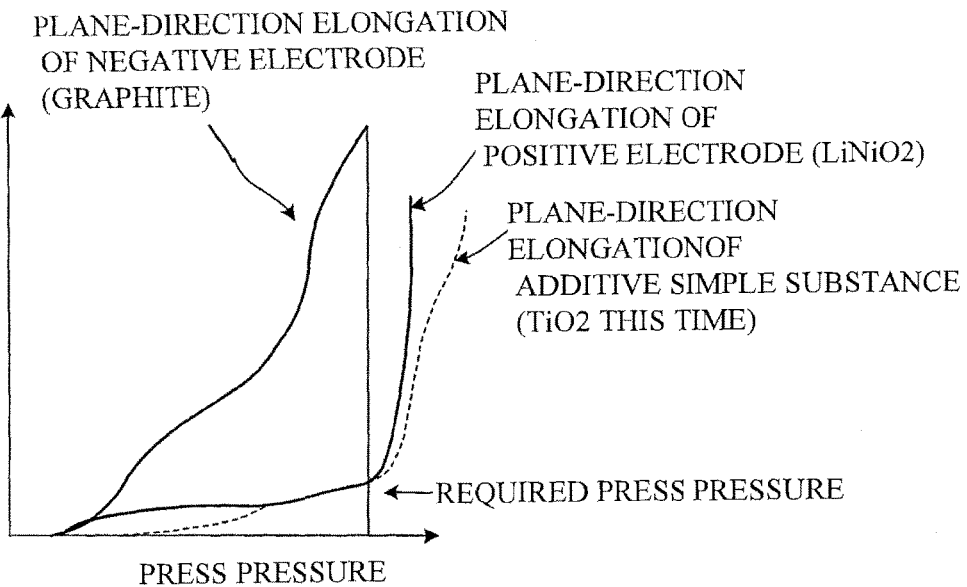
FIG. 7 is a characteristic diagram illustrating how positive/negative electrode active materials and a density adjusting additive are elongated in the plane direction relative to a pressing pressure.

In the experiment carried out by the applicant, the relation between a press pressure and elongation in the plane direction was investigated after adding 5 wt % binder to each simple substance of $LiNiO_2$ being a positive electrode active material, graphite being a negative electrode active material and $TiO_2$ being an additive so as to be applied on aluminum foil serving as the collector 11. FIG. 7 illustrates elongation characteristics in the plane direction on the positive electrode active material layer 12, elongation characteristics in the plane direction on the negative electrode active material layer 13 and elongation characteristics in the plane direction in $TiO_2$ simple substance being an additive, with respect to a press pressure. In the experimental result, it was confirmed that both $TiO_2$ elongation in the plane direction and $LiNiO_2$ elongation in the plane direction fall in about 1% with no warp occurrence in the electrode.

Note that an additive having mechanical characteristics in relation to a press pressure and elongation to make the additive more difficult to crush than an active material in the electrode active material layer which is difficult to crush may also be added to the electrode active material layer which is easily crushed. Even in this case, mechanical characteristics in relation to press and elongation are more approximated between the positive electrode active material layer 12 and the negative electrode active material layer 13 and a difference in the elongation rate in pressing is reduced therebetween. In particular, adding an additive which is more difficult to crush contributes to reduction of an added amount required to keep balance of the strength on both sides of the collector 11.

A reference example shown in FIG. 8 is provided with a structure in which a large number of protrusions that are difficult to crush are arranged on a side of the collector, on which the negative electrode active material layer is formed, and included in the negative electrode active material layer to be formed. Note that same reference numbers refer to corresponding devices appeared in the aforementioned explanation and explanation thereof will be omitted or simplified.

Figure 8A:
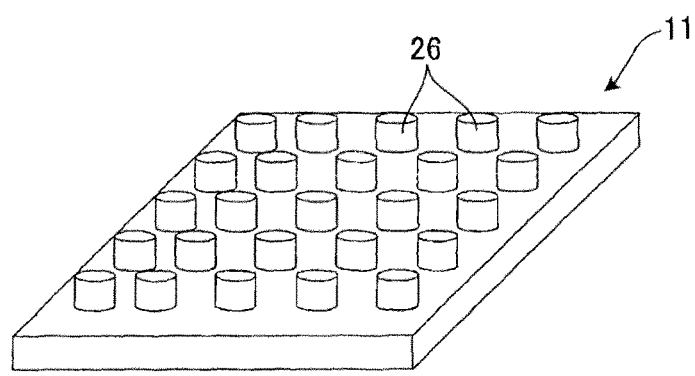
FIG. 8A is a perspective view of a collector according to an example in which protrusions corresponding to a density adjusting additive are arranged in the collector.

In this example, the collector 11 to be used contains a large number of emboss protrusions 26 arranged on a side to form the negative electrode active material layer 13 as shown in FIG. 8A by implementing press working at a high temperature in a resin film containing conductive filler, using a cylindrical emboss roll (e.g. forming columns of ⌀2.5 mm pitch with a depth of 90 µm).

Next, a positive electrode active material which is, for example, $LiNiO_2$ powder is mixed with PVDF serving as a binding agent and carbon powder serving as a conductive auxiliary. Then, the mixture is dispersed in NMP which is a slurry viscosity adjusting solvent to create a positive electrode slurry which is applied and dried on a surface of the collector 11 without the emboss protrusions in order to create the positive electrode active material layer 12.

Next, a negative electrode active material which is, for example, graphite powder is mixed with PVDF serving as a bonding agent and the mixture is dispersed in NMP which is a slurry viscosity adjusting solvent to create negative electrode slurry. Then, it is applied and dried on a surface of the collector 11, on which the emboss protrusions 26 are present, in order to form the negative electrode active material layer 13, whereby formation of the bipolar electrode 14 is completed.

Figure 8B:
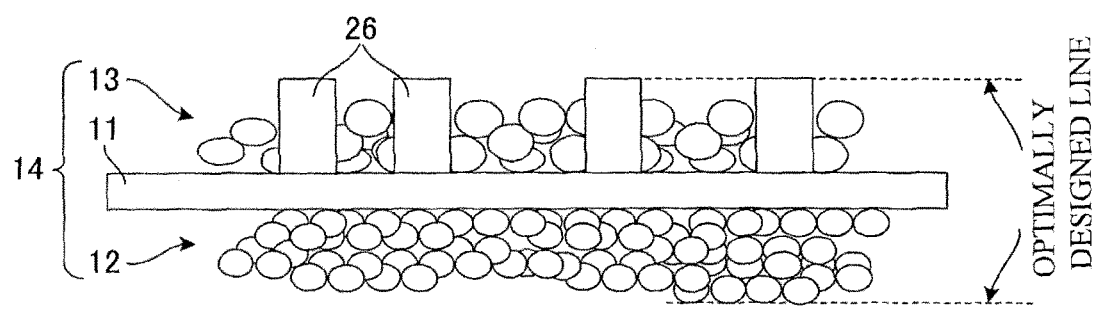
FIG. 8B is an explanatory diagram illustrating a state after pressing a bipolar electrode composed of the collector of FIG. 8A.

Then, FIG. 8B illustrates the bipolar electrode 14 obtained after a density adjustment was made for the bipolar electrode 14 by pressing the positive and negative electrode active material layers 12 and 13 from both sides. The thickness of the negative electrode active material layer 13 provided after pressing each of the layers can be, for example, 100 μm by being restricted to the height of a large number of the emboss protrusions 26 formed on the collector 11 or, for example, 90 μm.

Accordingly, in the present example, the negative electrode active material layer 13, which internally contains a large number of the emboss protrusions 26 that are arranged on the collector 11 and difficult to crush, are made difficult to crush even when it is pressed for density adjustment. Therefore, even if the bipolar electrode is pressed with a high press pressure to realize high filling of the positive electrode active material layer, the negative electrode active material layer 13 is allowed to maintain an optimally designed thickness to exhibit the most satisfactory characteristics. As a result, it is possible to prevent an elongation difference which is observed between the positive electrode active material layer 12 and the negative electrode active material layer 13 when they are pressed and causes the bipolar electrode 14 to warp. Thus suppressing a warp makes it possible to suppress reduction of capacity retention in the battery element 17 and also suppress reduction of durability to vibrations. Handling the bipolar secondary battery 10 in a lamination process can also be improved, in addition to enable improvement of reliability of the seal member to be laminated.

In the present embodiment, effects as described below can be exhibited.

A) The bipolar electrode 14 is composed of a first active material layer which is, for example, the positive electrode active material layer 12 formed to include a first active material on one side of the collector 11, and a second active material layer which is, for example, the negative electrode active material layer 13 formed to include a second active material whose compressive strength is less than that of the first active material formed on the other side of the collector 11. Then, the density adjusting additive 25 which serves as an additive material whose compressive strength is larger than that of the second active material is included in the second active material layer.

Therefore, the degree of crushing the second active material layer in pressing can be suppressed by an additive material with large compressive strength. Accordingly, even if the bipolar electrode 14 is pressed from both sides with a high press pressure in order to realize high filling of the positive electrode active material layer 12, an elongation difference of the second active material layer to the first active material layer can be reduced. It is therefore possible to reduce a stress difference occurring between the active material layers 12 and 13 at the front and back of the collector 11 and suppress a warp of the bipolar electrode 14. As a result, reduction of capacity retention in the battery element 17 can be reduced while enabling to suppress reduction of durability to vibrations. Handling the bipolar secondary battery 10 in a lamination process can also be improved with improved reliability of the seal part 21.

B) In the bipolar electrode 14 shown in FIG. 3 in which the density adjusting additive 25 serving as an additive material has a larger particle diameter than the second active material, an added amount of the additive material required to obtain the effect A) can be reduced. In addition, in the case of forming the density adjusting additive 25 into an anisotropic cylindrical, conical or rectangular shape or similar shape with a long side dimension close to a thickness dimension of the pressed second active material layer, an added amount of the additive material required to obtain the effect A) can be further reduced.

C) In the bipolar electrode 14 shown in FIG. 6, compressive strength of the density adjusting additive 25 serving as an additive material is made equal to that of the first active material, wherein elongation of the second active material layer when it is pressed can be made equivalent to that of the first active layer by the included additive material and a warp of the bipolar electrode 14 can be suppressed irrespective to a press pressure.

D) In the bipolar electrode 14 shown in FIG. 5, owing to the additive material which can be used as an active material by itself, a warp of the bipolar electrode 14 is suppressed while enabling elimination of a charge/discharge loss because the additive itself is a chargeable/dischargeable active material.

E) The battery element 17 can be formed by preparing a single piece or laminating a plurality of the bipolar electrode 14 described in any of the effects A) to E) with arrangement of the seal part 21 in the outer periphery and laminating the collectors 11a and 11b, each of which is obtained by arranging the positive electrode active material layer 12 or the negative electrode active material layer 13 on only one side of the collector, on both sides of the lamination. In the battery element 17, a warp of the bipolar electrode 14 is suppressed so that reduction of capacity retention in the battery element 17 can be suppressed and reduction of durability to vibrations can also be suppressed. Handling the bipolar secondary battery 10 in the lamination process can also be improved to enable reduction of manufacturing costs of the battery element 17. Also, owing to the warp suppression in the bipolar electrode 14, reliability of a seal property in the seal part 21 arranged in the outer periphery can be improved.

F) Owing to the manufacturing method including a process to apply a slurry containing a first active material on one side of the collector 11 and a process to apply, on the other side of the collector 11, a slurry obtained by mixing a second active material whose compressive strength is less than that of the first active material and the density adjusting additive 25 serving as an additive material whose compressive strength is larger than that of the second active material, the bipolar electrode 14 can be manufactured without increasing the number of manufacturing processes. In addition, in pressing the positive/negative electrode active material layers 12 and 13 for density adjustment after the slurry applied on both sides of the collector 11 has been dried, an elongation difference of the second active material layer to the first active material layer can be reduced. As a result, a stress difference occurring between the active material layers 12 and 13 at the front and back of the collector 11 can be reduced to allow warp suppression in the bipolar electrode 14.

G) A particle diameter of the density adjusting additive 25 serving as an additive material whose compressive strength is larger than that of the second active material is set to be equal to a designed value set for the thickness of the second active material layer, whereby the second active material layer provided after density adjustment of the positive/negative electrode active material layers 12 and 13 by pressing can have a thickness approximated as a designed value. In addition, an added amount of an additive material which is mixed with a second active material can be reduced.

H) In the bipolar electrode shown in FIG. 8, a large number of the emboss protrusions 26 that are hard protrusions difficult to crush with e a height equal to a designed value is arranged on a side of the collector 11, on which the second active material layer is formed, as a material contained in the second active material layer to suppress the amount of crushing the second active material layer in pressing. Therefore, the second active material layer provided after making a density adjustment for the positive/negative electrode active material layers 12 and 13 by pressing can have a thickness approximated as a designed value, whereby reducing an elongation rate difference of the second active material layer to the first active material layer when the bipolar electrode 14 is pressed from both sides with a high press pressure in order to realize high filling of the positive electrode active material layer 12, and reducing a stress difference occurring between the active material layers 12 and 13 at the front and back of the collector 11 so that a warp of the bipolar electrode 14 can be suppressed. Accordingly, reduction of capacity retention in the battery element 17 can be suppressed and reduction of durability to vibrations can also be suppressed. In addition, with no change made for positive/negative electrode active materials, the bipolar electrode 14 can be formed without a warp. Hard protrusions that are arranged on the collector 11 and difficult to crush with a height equal to a designed value can be easily formed by applying press working to the collector 11 at a high temperature using, for example, a cylindrical emboss roll (forming columns of Ø2.5 mm pitch with a depth of 90 μm).

EXAMPLES

The bipolar secondary battery 10 and the bipolar electrode 14 according to the present invention will be explained below by using each example. However, the present invention is not limited by any of the examples.

Example 1

Firstly, the positive electrode active material layer 12 was created in the following course. That is, $LiNiO_2$ powder (active material, accumulated particle size distribution 50%: 10 μm and 10%: 2 μm), PVDF (binding agent) and carbon powder (conductive auxiliary) were dispersed in NMP which is a slurry viscosity adjusting solvent at a ratio of 90:5:5 (weight ratio) in order to create a positive electrode slurry which was applied and dried on a resin film containing conductive filler serving as the collector 11 by a die coater to obtain the positive electrode active material layer 12. The positive electrode active material layer 12 thus obtained had compressive pressure of 1600 to 2400 kg/cm². The reason why the compressive strength ranges is because of particle diameter differences among active materials or other reasons. This situation similarly applies to graphite, hard carbon and silicon to be explained later.

Next, the negative electrode active material layer 13 was created in the following course. That is, graphite powder (active material, accumulated particle size distribution 50%: 20 μm and 10%: 5 μm, compressive strength of 480 to 720 kg/cm²), PVDF (binding agent) and alumina being the density adjusting additive 25 (volume particle size distribution D90: 30 μm and D50: 20 μm) were dispersed in NMP which is a slurry viscosity adjusting solvent at a ratio of 90:5:5 (weight ratio) in order to create a negative electrode slurry which was applied and dried on the opposite side of the resin film containing conductive filler, on which the positive electrode active material layer 12 had been formed, by a die coater to obtain the bipolar electrode 14 in the bipolar lithium ion secondary battery 10 as shown in FIG. 2.

Next, because an optimum press pressure of the positive electrode active material layer 12 is a linear pressure of 60 to 350 t/m, this linear pressure was used to press the positive electrode active material layer 12 and the negative electrode active material layer 13 simultaneously using a roll press machine. Thicknesses of the pressed active material layers were 100 μm in the positive electrode and 90 μm in the negative electrode. Note that an optimally designed value was 100 μm.

Next, the bipolar secondary battery 10 was created in the following course. Polypropylene nonwoven fabric of 50 μm was impregnated with 5 wt % monomer solution with an average molecular weight of 7500 to 9000 being a precursor of an ion conductive polymer matrix (i.e. copolymer of polyethylene oxide and polypropylene oxide), 95 wt % EC+DMC (at a ratio of 1:3) being a electrolytic solution, 1.0M $LiBF_4$ and a pregel solution made of polymerization initiator (BDK) and held by quartz glass substrates, followed by irradiating ultraviolet rays for fifteen minutes to crosslink the precursor in order to obtain the gel polymer electrolyte layer 15.

Thereafter, the nonwoven fabric holding an electrolyte was placed on the negative electrode active material layer 13 of the bipolar electrode 14 and three-layered hot melt was placed on the surroundings thereof to serve as a seal member. These layers were laminated to form a four-layered laminate, after which the seal part 21 was fused by applying heat and pressure from above and below to seal each of the layers. The laminated body made of these layers was sealed by a laminate pack to form the bipolar secondary battery 10.

Example 2

Firstly, the positive electrode active material layer 12 was created in the same manner as the example 1. The negative electrode active material layer 13 was also created in the following course. That is, graphite powder (active material, accumulated particle size distribution 50%: 20 μm and 10%: 5 μm), PVDF (binding agent) and alumina being the density adjusting additive 25 (volume particle size distribution D90: 30 μm and D50: 20 μm) were dispersed in NMP which is a slurry viscosity adjusting solvent at a ratio of 85:7:8 (weight ratio) in order to create a negative electrode slurry which was applied and dried on the opposite side of the resin film containing conductive filler, on which the positive electrode active material layer 12 had been formed, by a die coater to obtain the bipolar electrode 14 in the bipolar lithium ion secondary battery 10 as shown in FIG. 2. Next, the positive electrode active material layer 12 and the negative electrode active material layer 13 were pressed simultaneously by a roll press machine with a linear pressure similar to that of the example 1. Thicknesses of the pressed active material layers were 100 μm in the positive electrode and 105 μm in the negative electrode. Note that an optimally designed value was 105 μm. Next, the bipolar secondary battery 10 was formed by a method similar to that of the example 1.

Example 3

Firstly, the positive electrode active material layer 12 was created in the same manner as the example 1. The negative electrode active material layer 13 was also created in the following course. That is, graphite powder (active material, accumulated particle size distribution 50%: 20 μm and 10%: 5 μm), PVDF (binding agent) and alumina being the density adjusting additive 25 (volume particle size distribution D90: 90 μm and D50: 60 μm) were dispersed in NMP which is a slurry viscosity adjusting solvent at a ratio of 90:5:5 (weight ratio) in order to create a negative electrode slurry which was applied and dried on the opposite side of the resin film containing conductive filler, on which the positive electrode active material layer 12 had been formed, by a die coater to obtain the bipolar electrode 14 in the bipolar lithium ion secondary battery 10 as shown in FIG. 3. Next, the positive electrode active material layer 12 and the negative electrode active material layer 13 were pressed simultaneously by a roll press machine with a linear pressure similar to that of the example 1. Thicknesses of the pressed active material layers were 100 μm in the positive electrode and 100 μm in the negative electrode. Note that an optimally designed value was 100 μm. Next, the bipolar secondary battery 10 was formed by a method similar to that of the example 1.

Example 4

Firstly, the positive electrode active material layer 12 was created in the same manner as the example 1. The negative electrode active material layer 13 was also created in the following course. That is, graphite powder (active material, accumulated particle size distribution 50%: 20 μm and 10%: 5 μm), PVDF (binding agent) and a hard carbon additive being the density adjusting additive 25 (volume particle size distribution D90: 80 μm and D50: 60 μm, compressive strength of 1440 to 2160 kg/cm$^2$) were dispersed in NMP which is a slurry viscosity adjusting solvent at a ratio of 90:5:5 (weight ratio) in order to create a negative electrode slurry which was applied and dried on the opposite side of the resin film containing conductive filler, on which the positive electrode active material layer 12 had been formed, by a die coater to obtain the bipolar electrode 14 in the bipolar lithium ion secondary battery 10 as shown in FIG. 5. Next, the positive electrode active material layer 12 and the negative electrode active material layer 13 were pressed simultaneously by a roll press machine with a linear pressure similar to that of the example 1. Thicknesses of the pressed active material layers were 100 μm in the positive electrode and 90 μm in the negative electrode. Note that an optimally designed value was 90 μm. Next, the bipolar secondary battery 10 was formed by a method similar to that of the example 1.

Reference Example 5

Firstly, to provide the collector 11 to be used, press working was applied to a resin film containing conductive filler at a high temperature by a cylindrical emboss roll (e.g. forming columns of Ø2.5 mm pitch with a depth of 90 μm) in order to arrange a large number of the emboss protrusions 26 on a side on which the negative electrode active material layer 13 is formed as shown in FIG. 8A.

Next, a positive electrode slurry created in the same manner as the example 1 was applied and dried on a surface of the resin film containing conductive filler, on which no emboss working was applied, by a die coater in order to create the positive electrode active material layer 12.

Next, the negative electrode active material layer 13 was created in the following course. That is, graphite powder (active material, accumulated particle size distribution 50%: 20 μm and 10%: 5 μm) and PVDF (binding agent) were dispersed in NMP which is a slurry viscosity adjusting solvent at a ratio of 95:5 (weight ratio) in order to create a negative electrode slurry which was applied and dried on a surface subjected to emboss working on the opposite side of the resin film containing conductive filler, on which the positive electrode active material layer 12 had been formed, by a die coater to obtain the bipolar electrode 14 in the bipolar lithium ion secondary battery 10 as shown in FIG. 8B.

Next, the positive electrode active material layer 12 and the negative electrode active material layer 13 were pressed simultaneously by a roll press machine with a linear pressure similar to that of the example 1. Thicknesses of the pressed active material layers were 100 μm in the positive electrode and 100 μm in the negative electrode. Note that an optimally designed value was 100 μm. Next, the bipolar secondary battery 10 was formed by a method similar to that of the example 1.

Example 6

Firstly, the positive electrode active material layer 12 was created in the same manner as the example 1. The negative electrode active material layer 13 was also created in the following course. That is, graphite powder (active material, accumulated particle size distribution 50%: 20 μm and 10%: 5 μm), PVDF (binding agent) and TiO2 additive being the density adjusting additive 25 (volume particle size distribution D90: 80 μm and D50: 60 μm) were dispersed in NMP which is a slurry viscosity adjusting solvent at a ratio of 90:5:5 (weight ratio) in order to create a negative electrode slurry which was applied and dried on the opposite side of the resin film containing conductive filler, on which the positive electrode active material layer 12 had been formed, by a die coater to obtain the bipolar electrode 14 in the bipolar lithium ion secondary battery 10 as shown in FIG. 6.

Next, the positive electrode active material layer 12 and the negative electrode active material layer 13 were pressed simultaneously by a roll press machine with a linear pressure similar to that of the example 1. Thicknesses of the pressed active material layers were 100 μm in the positive electrode and 100 μm in the negative electrode. Note that an optimally designed value was 100 μm.

In addition, 5 wt % binder was added to each simple substance of LiNiO$_2$ being a positive electrode active material, graphite being a negative electrode active material and TiO$_2$ being an additive so as to be applied on aluminum foil serving as the collector 11, after which the relation between a press pressure and elongation in the plane direction was investigated. It was confirmed that an elongation degree of TiO$_2$ in the plane direction is the same as an elongation degree of LiNiO$_2$ in the plane direction under a targeted press pressure.

In addition, concerning an elongation rate of the finished bipolar electrode 14, both the positive electrode active material layer 12 and the negative electrode active material layer 13 were finished with elongation of about 1% and no warp occurrence in the bipolar electrode 14 was visually confirmed. Next, the bipolar secondary battery 10 was formed by a method similar to that of the example 1.

Note that silicon (with compressive strength of 96 to 1440 kg/cm$^2$) may also be used in place of graphite powder used in each of the above examples. As stated above, any elements that can be alloyed with lithium can be used without being limited to silicon, but silicon is preferable among elements that can be alloyed with lithium not only from the viewpoint of capacity and energy density and but also from the viewpoint of practical use and hardness.

However, even if either graphite powder or an element which can be alloyed with lithium is used as a negative electrode active material, the comparison between the positive electrode active material layer 12 and the negative electrode active material layer 13 according to each of the above examples reveals the negative electrode active material layer 13 is still easier to crush. Accordingly, the density adjusting additive 25 is to be added to the negative electrode.

Comparative Example 1

Firstly, the positive electrode active material layer 12 was created in the same manner as the example 1. The negative electrode active material layer 13 was also created in the following course. That is, graphite powder (active material, accumulated particle size distribution 50%: 20 μm and 10%: 5 μm) and PVDF (binding agent) were dispersed in NMP which is a slurry viscosity adjusting solvent at a ratio of 95:5 (weight ratio) in order to create a negative electrode slurry which was applied, dried and compressed on the opposite side of the resin film containing conductive filler, on which the positive electrode active material layer 12 had been formed, by a die coater to obtain the bipolar electrode 14 in the bipolar lithium ion secondary battery 10.

Next, the positive electrode active material layer 12 and the negative electrode active material layer 13 were pressed simultaneously by a roll press machine with a linear pressure similar to that of the example 1. Thicknesses of the pressed active material layers were 100 μm in the positive electrode and 70 μm in the negative electrode. Note that an optimally designed value was 85 μm. It was visually confirmed that the bipolar electrode 14 had an extremely large warp. Next, the bipolar secondary battery 10 was formed by a method similar to that of the example 1.

Evaluation Test Method

<Capacity Confirmation Test>

Twenty pieces of each of the bipolar secondary batteries 10 according to the examples and the reference example 1 to 6 and the comparative example 1 were firstly subjected to a capacity confirmation test in the following course. The capacity confirmation test was carried out by applying constant current charge (CC) to reach 13.5 V with a current corresponding to a battery capacity of 0.1 C, followed by applying constant voltage charge (CV) to reach a total of fifteen-hour charge, followed by discharging to fall in 7.5 V with a current of 0.1 C in order to confirm a charge/discharge capacity.

<Charge/Discharge Cycle Test>

Next, twenty pieces of each of the bipolar secondary batteries 10 according to the examples and the reference example 1 to 6 and the comparative example 1 were subjected to a charge/discharge cycle test in the following course. In the test, a charge/discharge cycle experiment was carried out for 100 cycles by using, as one cycle, a cycle of applying constant current charge (CC) to reach 13.5 V with a current corresponding to a battery capacity of 0.5 C, followed by applying constant voltage charge (CV) to reach a total of five-hour charge, followed by discharging to fall in 7.5 V with a current of 0.5 C. Then, a charge/discharge capacity obtained after performing 100 cycles of charge/discharge was measured as a cycle retention rate % to find out how much charge/discharge capacity is held on the assumption that a charge/discharge capacity held after performing a charge/discharge cycle for the first time is 100%.

<Vibration Test>

Next, twenty pieces of each of the bipolar secondary batteries 10 according to the examples and the reference example 1 to 6 and the comparative example 1 were subjected to constant current charge (CC) to reach 13.5 V with a current corresponding to a charge capacity of 0.5 C, followed by constant voltage charge (CV) to reach a total of five-hour charge, followed by applying vibrations in the following course for a long period of time, after which a voltage maintenance ratio was measured by voltage measurement. The vibration test was carried out by applying monotonous vibrations with amplitude of 3 mm in the vertical direction at 50 Hz to each of the firmly fixed secondary batteries 10 for two hundred hours. Then, a voltage maintenance ratio V relative to a voltage outputted before the vibration test was evaluated by evaluating the presence and absence of liquid leakage occurring from the seal part 21 after the vibration test and measuring a voltage outputted after the vibration test for twenty pieces of each of the respective secondary batteries 10.

Table 1 shows a cycle retention rate obtained after 100 cycles of charge/discharge and evaluation results including evaluation of the presence and absence of liquid leakage occurring from the seal part 21 and a voltage maintenance ratio obtained after the vibration test (i.e. voltage reduction amount V relative to a voltage outputted before the vibration test) with respect to the bipolar secondary batteries 10 according to the examples and the reference example 1 to 6 and the comparative example 1.

TABLE 1

|  | Cycle retention rate (after 100 cyc) | Vibration test |
|---|---|---|
| Example 1 | 85% | 15/20, no liquid leakage OK, average −0.2 V |
| Example 2 | 93% | 17/20, no liquid leakage OK, average −0.12 V |
| Example 3 | 94% | 18/20, no liquid leakage OK, average −0.11 V |
| Example 4 | 93% | 18/20, no liquid leakage OK, average −0.19 V |
| Example 5 | 94% | 17/20, no liquid leakage OK, average −0.18 V |
| Example 6 | 91% | 20/20, no liquid leakage OK, average −0.10 V |
| Comparative Example 1 | 50% | 2/20, no liquid leakage OK, average −4.5 V (potential drop occurred due to liquid junction in seal part) |

As shown in the table 1, in the test results of the charge/discharge cycle test, the comparison between the comparative example 1 and the examples and the reference example 1 to 6 reveals that the comparative example 1 has a significantly reduced charge/discharge capacity with a cycle retention rate of 50% because the negative electrode active material layer 13 is crushed too much to result in a thickness of 70 μm relative to an optimally designed value of 85 μm.

In contrast, in the examples and the reference example 1 to 6 in which the negative electrode active material layer 13 has a thickness equivalent to or slightly thinner than an optimally designed value, a satisfactory charge/discharge capacity is maintained with a cycle retention rate of 85 to 94%.

In addition, the comparison of 1 to 6 reveals that reduction of a charge/discharge capacity is large with a cycle retention rate of 85% in the example 1 in which the negative electrode active material layer 13 has a slightly thinner thickness than an optimally designed value. However, satisfactory results are obtained in the examples and the reference example 2 to 6 with a cycle retention rate of 91 to 94% in which the negative electrode active material layer 13 is allowed to maintain a thickness equivalent to an optimally designed value and reduction of a charge/discharge capacity is suppressed to a slight amount.

Also, in the results of the vibration test, the comparison between the comparative example 1 and the examples and the reference example 1 to 6 reveals substantial reduction of a voltage maintenance ratio in the comparative example 1 with an average of −4.5 V. This is considered to have been caused by occurrence of a potential drop due to liquid junction and short circuit between the collectors 11 resulting from liquid leakage from the seal part 21. Two pieces out of the twenty batteries had liquid leakage and eighteen pieces had no liquid leakage.

In contrast, a voltage maintenance ratio is suppressed to slight reduction in the examples and the reference example 1 to 6 with an average of −0.1 V to 0.2 V. Although five pieces out of the twenty batteries were found to have liquid leakage in the example 1 by visual evaluation to find out the presence and absence of liquid leakage, occurrence of liquid leakage is reduced to two to three pieces out of the twenty batteries in the examples and the reference example 2 to 5 and no leakage occurred in the example 6. This is because the example 1 is assumed to have resulted in a failure of the seal caused by a warp occurred in the bipolar electrode 14 due to the negative electrode active material layer 13 whose thickness was slightly made thinner than an optimally designed value. On the other hand, the examples and the reference example 2 to 6 in which the negative electrode active material layer 13 is allowed to maintain a thickness equivalent to an optimally designed value is assumed to have suppressed a warp of the bipolar electrode 14 and therefore suppressed a failure of the seal caused by a warp. In particular, the example 6 in which the negative electrode active material layer 13 and the positive electrode active material layer 12 are adjusted to have an equivalent elongation rate in pressing has no warp occurred in the bipolar electrode 14 and thus it is assumed that a failure of the seal is significantly suppressed.

The embodiment according to the present invention is as explained above, wherein a part of application examples of the present invention is shown in the above embodiment with no intention to limit a technical scope of the present invention by the concrete structures of the above embodiment.

The present application claims priority based on Patent Application No. 2010-168984 filed with Japanese Patent Office on Jul. 28, 2010 and the entire contents of the application are hereby incorporated by reference in the present specification.

The invention claimed is:

1. A bipolar electrode comprising:
a collector;
a first active material layer including a first active material formed on one side of the collector; and
a second active material layer including a second active material having a smaller compressive strength than that of the first active material formed on an other side of the collector, the first active material layer and the second active material layer being subjected to press working for density adjustment, wherein
the bipolar electrode does not include an electrolyte layer,
the press working for density adjustment is simultaneously applied to the first active material layer and the second active material layer from both sides of the bipolar electrode, and the press working for density adjustment is not applied to the electrolyte layer,
for reduction of a difference between elongation of the first active material layer and elongation of the second active material layer resulting from the press working for density adjustment, an additive material having a larger compressive strength than that of the second active material is only included in the second active material layer,
the second active material is present in a greater wt % than the additive material,
the additive material comprises alumina, titanium dioxide, magnesium oxide, solid hard carbon material, silicon, or silicon oxide, and
the additive material has a larger particle diameter than the second active material.

2. The bipolar electrode according to claim 1, wherein the compressive strength of the additive material is equal to that of the first active material.

3. The bipolar electrode according to claim 1, wherein the compressive strength of the additive material is larger than that of the first active material.

4. A bipolar secondary battery using the bipolar electrode according to claim 1.

5. A method for manufacturing a bipolar electrode comprising:
applying a first slurry including a first active material on one side of a collector;
applying, on the other side of the collector, a second slurry obtained by mixing a second active material having a smaller compressive strength than that of the first active material and an additive material having a larger compressive strength than that of the second active material; and
simultaneously pressing the first slurry and the second slurry from both sides of the bipolar electrode, wherein
the bipolar electrode does not include an electrolyte layer,
the step of simultaneously pressing the first slurry and the second slurry from both sides of the bipolar electrode does not include pressing the electrolyte layer,
the additive material is only included in the second slurry,
the second active material is present in a greater wt % than the additive material,
the additive material comprises alumina, titanium dioxide, magnesium oxide, solid hard carbon material, silicon, or silicon oxide, and
the additive material has a larger particle diameter than the second active material.

6. The method for manufacturing the bipolar electrode according to claim 5, wherein a particle diameter of the additive material having a larger compressive strength than that of the second active material is set to be equal to a design value of a thickness of the second active material layer.

7. The bipolar electrode according to claim 1, wherein a maximum particle diameter is substantially equal to a thickness of the second active material layer after pressing.

8. The method for manufacturing the bipolar electrode according to claim 5, wherein a maximum particle diameter is substantially equal to a thickness of the second active material layer after pressing.

9. The bipolar electrode according to claim 1, wherein the additive material comprises alumina.

10. The bipolar electrode according to claim 1, wherein the additive material comprises titanium dioxide.

11. The bipolar electrode according to claim 1, wherein the additive material comprises magnesium oxide.

12. The bipolar electrode according to claim 1, wherein the additive material comprises silicon.

13. The bipolar electrode according to claim 1, wherein the additive material comprises silicon oxide.

* * * * *